(12) United States Patent
Jakobsson

(10) Patent No.: US 10,498,735 B2
(45) Date of Patent: Dec. 3, 2019

(54) VISUALIZATION OF ACCESS INFORMATION

(71) Applicant: PAYPAL, INC., San Jose, CA (US)

(72) Inventor: Markus Jakobsson, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 693 days.

(21) Appl. No.: 15/012,166

(22) Filed: Feb. 1, 2016

(65) Prior Publication Data

US 2016/0149922 A1    May 26, 2016

Related U.S. Application Data

(63) Continuation of application No. 13/046,079, filed on Mar. 11, 2011.

(51) Int. Cl.
*H04L 29/06* (2006.01)
*G06Q 30/02* (2012.01)
*G06Q 20/40* (2012.01)
*H04L 29/08* (2006.01)
*G06F 3/048* (2013.01)

(52) U.S. Cl.
CPC .......... *H04L 63/10* (2013.01); *G06Q 20/401* (2013.01); *G06Q 30/0225* (2013.01); *H04L 67/02* (2013.01); *H04L 67/18* (2013.01); *G06F 3/048* (2013.01)

(58) Field of Classification Search
CPC ....... G06F 3/048; G06F 21/552; H04L 63/10; H04L 63/0876; H04L 67/18; G06Q 20/401; G06Q 30/0225
See application file for complete search history.

(56) References Cited

U.S. PATENT DOCUMENTS

| | | | |
|---|---|---|---|
| 7,966,321 B2 | 6/2011 | Wolosin et al. | |
| 8,151,343 B1 | 4/2012 | Wang et al. | |
| 8,214,899 B2 | 7/2012 | Chien | |
| 2007/0220605 A1* | 9/2007 | Chien | G06F 21/552 726/23 |
| 2008/0301562 A1* | 12/2008 | Berger | G06F 17/3089 715/733 |
| 2009/0049051 A1* | 2/2009 | Horowitz | G06F 17/30035 |
| 2009/0055093 A1* | 2/2009 | Hamilton, II | G06F 16/58 701/533 |

(Continued)

*Primary Examiner* — Vivek Srivastava
*Assistant Examiner* — Muhammad Raza
(74) *Attorney, Agent, or Firm* — Haynes and Boone, LLP

(57) ABSTRACT

A request to access a resource is received from a machine. The request contains machine data. Contextual information is retrieved from the request based on one or more computer operations performed on the machine data. The contextual information contains one or more technical terms in computer technology. The contextual information comprises at least one of the following: information indicating a service provider used to send the request; information indicating a type of hardware device used to send the request; and information indicating a configuration of software used to send the request. An object is associated with the retrieved contextual information. The object has a visual component that symbolizes the one or more technical terms of the contextual information in a visual manner. The object is communicated to an entity.

20 Claims, 4 Drawing Sheets

(56) References Cited

U.S. PATENT DOCUMENTS

| | | | |
|---|---|---|---|
| 2009/0144138 A1* | 6/2009 | Nomula | G06Q 30/00 705/14.65 |
| 2009/0286502 A1* | 11/2009 | Sennett | H04L 12/1895 455/404.1 |
| 2010/0017889 A1 | 1/2010 | Newstadt et al. | |
| 2010/0146609 A1 | 6/2010 | Bartlett | |
| 2010/0199338 A1* | 8/2010 | Craddock | G06F 21/31 726/7 |
| 2010/0274691 A1 | 10/2010 | Hammad et al. | |
| 2011/0028187 A1* | 2/2011 | Kelkka | H04M 3/42068 455/567 |
| 2011/0107436 A1* | 5/2011 | Cholas | H04N 21/2541 726/29 |
| 2011/0314558 A1* | 12/2011 | Song | G06F 21/316 726/28 |
| 2011/0316697 A1* | 12/2011 | Krahnstoever | G08B 13/19608 340/540 |
| 2012/0102219 A1* | 4/2012 | Speckbacher | H04L 29/12066 709/238 |
| 2012/0151364 A1* | 6/2012 | Chueh | H04L 12/66 715/736 |
| 2012/0179671 A1 | 7/2012 | Turner et al. | |
| 2017/0300453 A1* | 10/2017 | Shen | G06F 15/16 |

* cited by examiner

VISUALIZATION OF ACCESS INFORMATION

CLAIM OF PRIORITY

The present application is a continuation application of U.S. patent application Ser. No. 13/046,079, filed on Mar. 11, 2011, entitled "Visualization of Access Information", the content of which is herein incorporated by reference in its entirety.

BACKGROUND

Technical Field

The present invention generally relates to monitoring online access information and, more particularly, to sending alerts to users over online access of a resource.

Related Art

Online transactions are becoming more and more prevalent, with an ever-increasing number of online entities that may or may not have a physical real world counterpart. Furthermore, the services offered by these online entities have been improving as well. The popularity of online transactions is partially attributable to the ease and convenience of making a transaction online instead of at a physical location. Unfortunately, the popularity of online transactions has also led to an increase in online fraud activities. For example, a person may illegally obtain access to a victim's online account(s), and may attempt to purchase goods from the victim's account(s). The presence of fraudulent online activities underscores the need for careful and consistent monitoring of users' online activities, including access to these accounts. This is traditionally performed by both service providers (who look for unusual activity) and users (who detect transactions they did not perform.) This disclosure focuses on the latter. Conventional methods of monitoring online activities may be too technically complex for an average user. As such, the average user may become confused or flustered and may abandon any attempt to monitor online activities altogether.

Therefore, while existing online activity monitoring mechanisms have been generally adequate for their intended purposes, they have not been entirely satisfactory in every aspect. It would be advantageous to offer an online activity monitoring mechanism that is simple and intuitive for the average user.

SUMMARY

One of the broader forms of the present disclosure involves a method. The method involves: receiving a request to access a resource; retrieving contextual information from the request; and dynamically associating an object with the retrieved contextual information, the object having at least one of: an audio component and a visual component that represent the contextual information in an auditory manner and a visual manner, respectively.

Another one of the broader forms of the present disclosure involves an apparatus comprising a non-transitory, tangible computer readable storage medium storing a computer program. The computer program has instructions that when executed, carry out: receiving a request to access a resource; retrieving contextual information from the request; and dynamically associating an object with the retrieved contextual information, the object having at least one of: an audio component and a visual component that represent the contextual information in an auditory manner and a visual manner, respectively.

Yet another one of the broader forms of the present disclosure involves a system. The system involves: means for receiving a request to access a resource; means for retrieving contextual information from the request; means for dynamically associating an object with the retrieved contextual information, the object having at least one of: an audio component and a visual component that convey the contextual information in an auditory manner and a visual manner, respectively; and means for communicating the object to an entity, wherein the entity is selected from the group consisting of: a machine that is making the request, a user whose account is to be accessed by the request, and a representative of the user.

DETAILED DESCRIPTION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

It is to be understood that the following disclosure provides many different embodiments, or examples, for implementing different features of the invention. Specific examples of components and arrangements are described below to simplify the present disclosure. These are, of course, merely examples and are not intended to be limiting. Various features may be arbitrarily drawn in different scales for simplicity and clarity.

Figure 1:
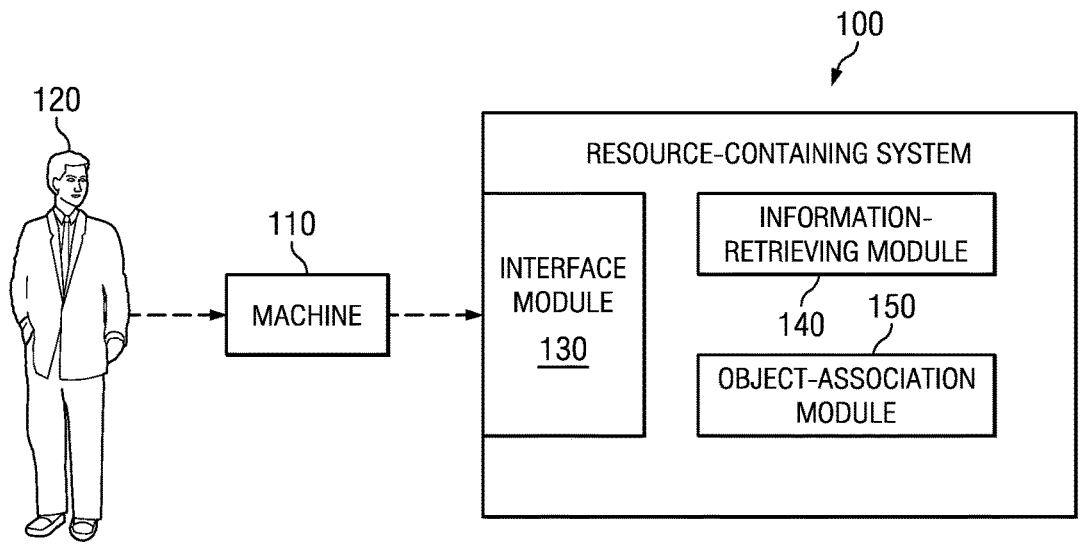
FIG. 1 illustrates a simplified block diagram view showing a resource-containing system receiving an access request from a user.

FIG. 1 is a simplified block diagram of a resource-containing system 100. The resource-containing system 100 may be configured for allowing Internet access and online transactions. In an embodiment, the resource-containing system 100 may be run by an online merchant who is engaged in selling of products (goods), where products or goods are used herein to include physical goods, services, or digital/virtual goods. Physical goods may include tangible items, including (but not limited to) clothing, electronics, tools, toys, household appliances, books, movies, automotive components, sporting equipment, groceries, etc. The digital/virtual goods may include goods that are stored, delivered, and/or used in an electronic format. As non-limiting examples, digital goods may include electronic-books, digital music files, digital images, digital videos, and other virtual items.

In another embodiment, the resource-containing system 100 may be run by other entities, such as a bank, a utilities (electrical, water, or gas) company, a governmental agency, an auction website, or any other service provider. The resource-containing system 100 may have accounts set up for users who access the resource-containing system. These user accounts and the physical or non-physical goods may all be considered resources. In addition, electronic information that is needed to access the resource-containing system 100 may also be considered resources. For example, such electronic information may include an Internet Protocol (IP) address or a Universal Resource Locator (URL) associated with the resource-containing system 100.

The resource-containing system 100 may receive requests to access its resources. In the embodiment shown in FIG. 1, an access request comes from a machine 110. The machine 110 may include a desktop computer, a laptop computer, a tablet computer, a Personal Digital Assistant (PDA) device, a mobile telephone, a headset or other user interface device, or another suitable device that is configured for network access, whether by itself or with the help of another device. It is also understood that although only one machine 110 is shown in FIG. 1, a plurality of other machines similar to the machine 110 may also be sending requests to access the resources of the resource-containing system 100.

In an embodiment, the machine 110 is sending the access request under a user 120's control. The user 120 is human and may or may not have an existing account with the resource-containing system 100. The user 120 may be trying to access the resource-containing system 100 for a number of reasons. For example, the user 120 may want to do any one of the following: purchasing a product, ordering a service, transferring funds, or simply browsing a website.

To prevent fraud, it is desirable to monitor the user 120's activities. For example, when the access request indicates to the resource-containing system 100 that the user 120 is attempting to make a purchase, it is beneficial to verify that the purchase request is indeed generated by the user 120, rather than a fraudster who is illegally posing as the user. This fraudster may be an unknown criminal or a friend or family member of the user who has not been authorized by the user to perform the transaction. Hence, the resource-containing system 100 may send an alert to the user 120 regarding the access request, for example through a telephone call, an email, or a text message. In an embodiment, the resource-containing system 100 waits for the user 120 to authorize the pending transaction before the resource-containing system 100 allows its resources to be accessed. In that manner, fraud may be prevented or at least reduced. However, the system may not always be able to detect that a transaction is suspicious. Whether this is detected or not, the legitimate user will want to be able to review past transactions and accesses (whether successful or not), and determine whether any of these correspond to unwanted activity. This is currently complicated for most users, as the access information is not easily understandable by most users.

Furthermore, monitoring the user 120's activities may also lead to reduction in disputes. As an example, the user 120 may have successfully purchased on an online merchant's website using a credit card. However, by the time the user 120 receives the credit card bill, many days have passed since the purchase, and the user may have completely forgotten about the purchase. To the user 120, the purchase appears to be fraudulent. As a result, the user 120 may initiate a dispute with the merchant or the credit card company, alleging the purchase was not authorized by the user. In many cases, these disputes will lead to charge-backs, in which the merchant drops the bill and takes the loss. Regardless of whether the user 120 initiated the dispute proceedings in good faith, such charge-backs may be costly and extremely frustrating to the merchant and/or the credit card company.

However, if the user's activities have been adequately monitored and a record of these activities are kept, then the merchant and/or the credit card company may send a record of the user's purchasing activity to the user, with details about when, where, and what device was used to make the purchase. If the user 120 initiated the dispute in good faith, these details may allow the user to recall that he indeed made the purchase and therefore results in the user cancelling the dispute. Even if the user 120 initiated the dispute in bad faith, these detailed records of the user's activities may require the user to overcome a higher burden of proof that his account was illegally accessed when the purchase was made. The difficulties associated with overcoming the higher burden of proof may deter the user 120 from initiating the dispute in bad faith, thereby also improving the quality and transparency of online transactions. For these reasons discussed above, it can be seen that it is important and desirable to monitor a user's activities.

Such monitoring may be done by the resource-containing system 100, or the user 120, or both. According to various aspects of the present disclosure, the resource-containing system 100 may extract or retrieve contextual information from the access request sent by the machine 110. In an embodiment, contextual information involves information that can be used to identify the machine 110, the user 120, or the access request itself. As non-limiting examples, the contextual information may include:

information indicating a geographical location (e.g., country, state, and/or city) from which the access request was sent;

information indicating a service provider (e.g., an Internet service provider) used to send the request;

information indicating a type of hardware device (e.g., the machine 110) used to send the request;

information indicating a configuration of software (e.g., operating system or browser) used to send the request.

application used to initiate the request (e.g., a game in which a payment platform can be accessed by the user to perform in-game transactions).

type of transaction (e.g., the type of merchandise purchased, or the merchant to which the purchase was performed).

historical (past) transaction information, which can be accumulated to form a pattern over time.

These types of contextual information and their retrieval methods are discussed in more detail below.

The resource-containing system 100 may include an interface module 130 containing software and hardware that allow the interface module to receive the access request from the machine 110. The resource-containing system 100 may also include an information-retrieving module 140 containing software and hardware that allow the information-retrieving module to retrieve or extract the contextual information from the access request. In an embodiment, the information-retrieving module 140 may perform a reverse IP address lookup operation on the access request. In more detail, the access request contains an IP address, which is a numerical label assigned to each device (e.g., computer, printer) participating in a computer network that uses the Internet Protocol for communication. Using this IP address of the access request, the reverse IP address lookup operation can extract contextual information such as the geographical location from which the access request is sent and/or the Internet service provider used to send it. As an example, the reverse IP address lookup operation may reveal that the access request is sent from the city of San Francisco in the state of California. As another example, the reverse IP address lookup operation may also reveal that the access request is sent using AT&T® as the Internet provider.

In an embodiment, the information-retrieving module 140 may also perform a Media Access Control (MAC) address lookup operation in addition to the reverse IP address lookup operation. A MAC address is a unique identifier (typically assigned by a manufacturer) of a network device for facilitating communications on a physical network. For example, MAC addresses are generally used in the MAC protocol sub-layer of the Open Systems Interconnection (OSI) model. A substantial majority of today's computers and wireless devices have their own unique MAC addresses. The interface module 130 can retrieve the MAC address of the machine 110, and the MAC address lookup operation performed by the information-retrieving module 140 reveals hardware information of the machine 110. For example, the MAC address lookup operation may reveal that the machine 110 is a LENOVO THINKPAD® T510 laptop. As another example, MAC address lookup operation may reveal that the machine 110 is an APPLE IPHONE 4® mobile telephone.

In an embodiment, the information-retrieving module 140 may identify a SIM card identifier, and associate this identifier with an account.

In an embodiment, the information-retrieving module 140 may also extract software or hardware configuration information from the access request. For example, through communication with a browser, the access request sent by the machine 110 may contain information such as what type of operating system (e.g., WINDOWS® or UNIX®), is installed on the machine 110, what type of Internet browser (e.g., INTERNET EXPLORER® or FIREFOX®) is used by the machine 110, or even the character and font set (English, German, Arabic, or Chinese) is used by the machine 110. These types of contextual information may also be retrieved. In other embodiments, "cookies" (a piece of text stored on a computer by its web browser) may also be used to retrieve contextual information including website preferences, shopping cart contents, an identifier for a server-based session, or computer activity histories. The contextual information may also include historical requests, for example the past transaction information associated with a specific user.

It is understood that the contextual information and their retrieval methods discussed above merely serve as non-limiting examples, and that in alternative embodiments, other types of contextual information, such as device identifiers, may be retrieved using the approaches discussed above or by alternative methods. However, they are not discussed herein for the sake of simplicity.

Once retrieved, it may be desirable to communicate the contextual information back to the user 120, as a part of the user activity monitoring. However, traditional methods and systems have been unable to communicate the contextual information to the user 120 in a meaningful and intuitive manner. One reason for such ineffective communication is due to the disparity in terms of computer technical knowledge between an average user and a systems operator/administrator in charge of communicating the contextual information. In more detail, most systems operators/administrators typically have a very good grasp of computers and networking operations. To these "techies," casual references to technical terms such as "IP addresses," "MAC addresses," or "cookies" may appear instantly intuitive. Therefore, it may not cross their minds that an example alert such as "Dear user, we have detected an attempted access to your account from a computer with the IP address of 123.53.64.43. Please confirm this is really you." may appear completely cryptic to an average user with no advanced computer or networking training. As a result, these monitoring alerts may confuse and frustrate the user, and may even discourage the user from allowing future monitoring of his activities. Therefore, for the monitoring to be effective and successful, an intuitive monitoring alert is desired.

Figure 2:
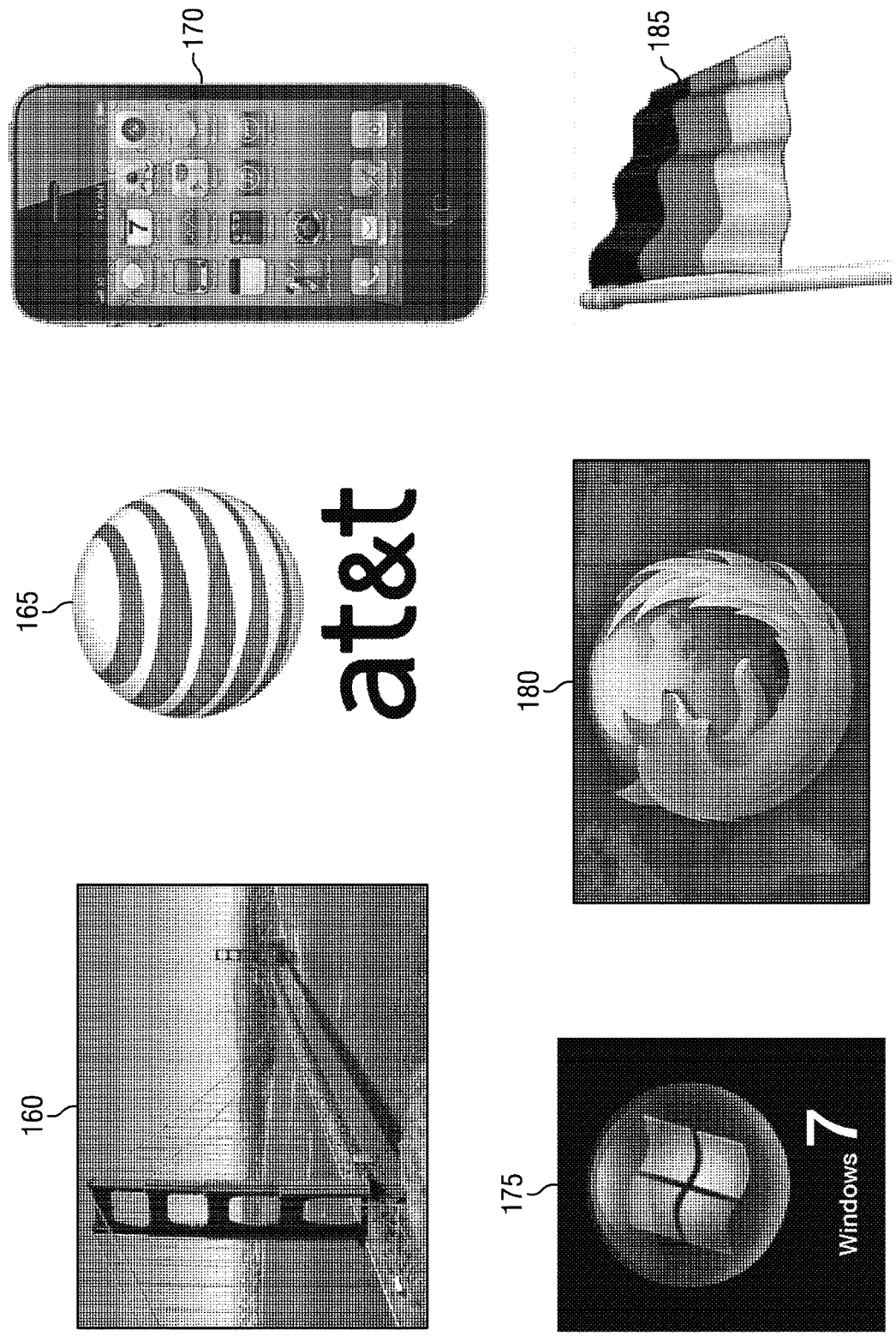
FIG. 2 illustrates a plurality of objects that can be associated with contextual information.

Here, the resource-containing system 100 may include a object-association module 150 that helps make the monitoring user-friendly. Instead of relying on the user 120 to understand technical terms, the object-association module 150 associates simple and intuitive objects to the extracted contextual information. The objects may include a visual component, or an audio component, or both. The objects may be well-known or publicly-known. Some example objects are illustrated in FIG. 2. It is understood that in some embodiments, the interface module 130, the information-retrieving module 140, and the object-association module 150 may be integrated together, completely or partially.

Referring to FIGS. 1 and 2, if the information-retrieving module 140 detects that the access request is sent from San Francisco, Calif., the object-association module 150 can associate this geographical contextual information with an object 160 that displays the Golden Gate Bridge (which is a symbol representing San Francisco). As another example, if the information-retrieving module 140 detects that the access request is sent using AT&T as a service provider, the object-association module 150 can associate this service-provider contextual information with an object 165 that is a logo of AT&T. As a further example, if the information-retrieving module 140 detects that the machine sending the access request is the APPLE IPHONE 4®, the object-association module 150 can associate this hardware contextual information with an object 170 that is a picture of the IPHONE 4®. As yet another example, if the information-retrieving module 140 detects that the machine 110 is running the WINDOWS 7® operating system (OS), the object-association module 150 can associate this OS configuration contextual information with an object 175 that is a logo of WINDOWS 7®. In one more example, if the information-retrieving module 140 detects that the access request is sent via FIREFOX® as a browser, the object-association module 150 can associate this browser configuration contextual information with an object 180 that is a logo of FIREFOX®. In yet another example, if the information-retrieving module 140 detects that the browser has the German character set installed, the object-association module 150 can associate this language contextual information with an object 185 that is a flag of Germany.

It is understood that the objects 160-185 discussed above merely serve as non-limiting examples as to what type of items can be considered as objects. In fact, anything item that can easily and intuitively convey the underlying contextual information may serve as objects. For example, since the objects can have an audio component, the object 160 representing the location of San Francisco may also include a song, such as the song "if you are going to San Francisco," and the object 175 representing the Windows 7® operating system may also include the standard WINDOWS® chime sound, and the object 185 representing the German language set may also include the sound byte "gutentag."

The objects 160-185 and numerous additional suitable objects may be stored in an electronic database, which may be implemented inside or outside the resource-containing system 100. The resource-containing system 100 may also include software programs containing algorithms that automatically determine (for example without human input) which objects should be associated with a piece of retrieved contextual information. In other embodiments, human operators or administrators may also be called upon to determine a suitable object to be associated with the retrieved contextual information.

Figure 3:
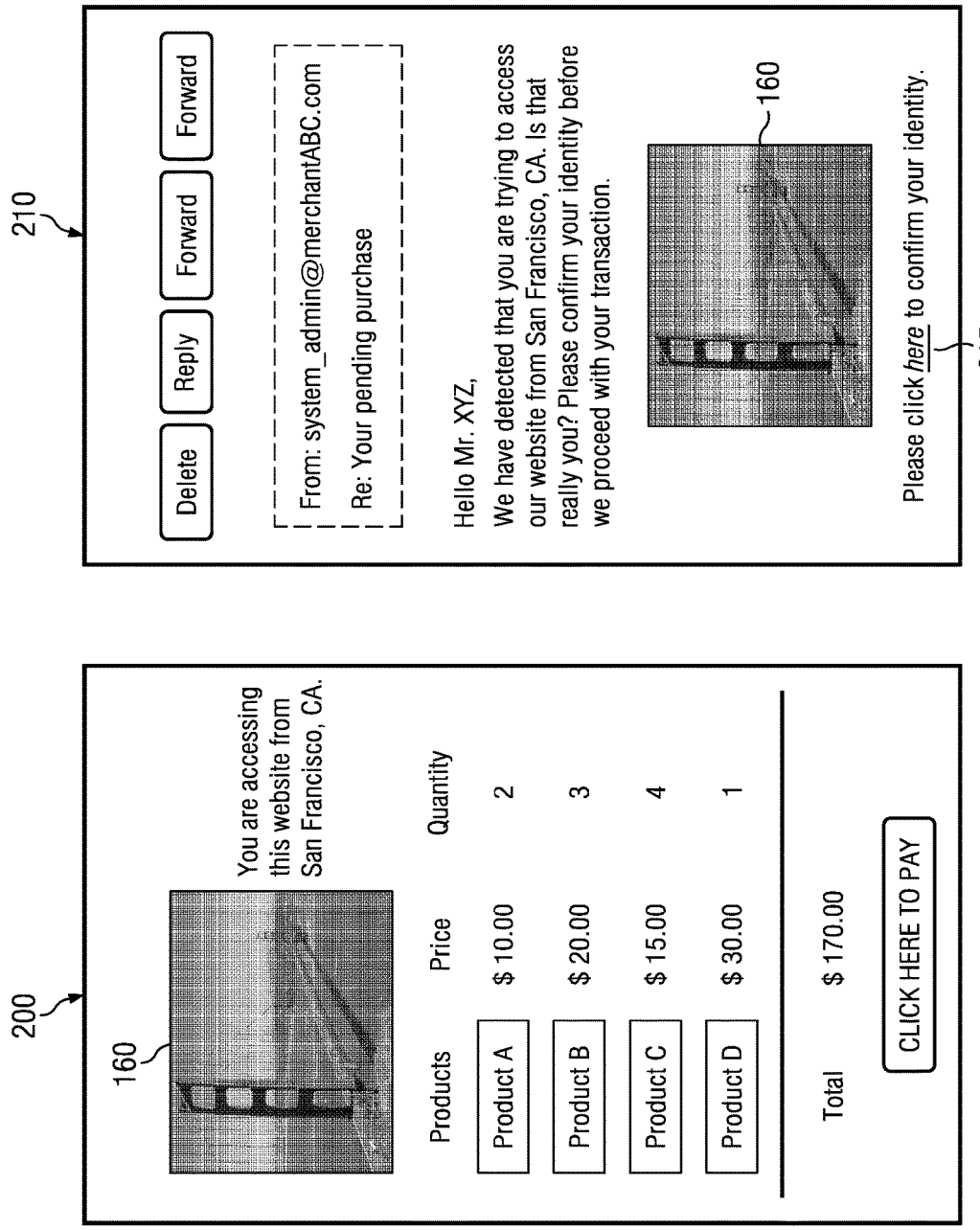
FIG. 3 illustrates two simplified screenshots of how objects can be communicated to the user.

After suitable object(s) are associated with the context information, the interface module 130 may then communicate the object to the machine 110 or the user 120, for example in the form of an alert message. In an embodiment, the interface module 130 may display and/or play the object on a screen of the machine 110. For example, refer to FIG. 3, a screenshot 200 containing the object 160 (picture of the Golden Gate Bridge) may be displayed on the machine, with an accompanying message "You are accessing this website from San Francisco, Calif." In another embodiment, the interface module 130 may send a text message or an email containing the object to the user 120, and may ask the user to confirm the access request indeed came from the user before granting the access request. For example, the user 120 may have an email or a mobile telephone number linked with his account. Shown in screenshot 210, the user 120 may receive an email or a text message displaying the object 160 and an accompanying text stating "Hello Mr. XYZ, we have detected that you are trying to access our website from San Francisco, Calif. Is that really you? Please confirm your identity before we proceed with your transaction." The email or text message may include a link 215 on which the user 120 can click to confirm his identity.

In other embodiments, one or more objects may be communicated to the user 120 in different ways, such as text or words only without a corresponding image or audio. For example, the user may simply see or hear that the request was communicated from a particular location, through a particular device, and/or through a particular service. Regardless of the specific mechanism of communication, the end result is that the user 120 can now intuitively understand what is happening. In other words, the user 120 need not decode or sort through confusing technical jargon, since the complex technical details are communicated to the user in a simple and intuitive manner that the user can now understand. In this manner, contextual access information relevant to the transaction can be visualized, which greatly enhances the feasibility and ease of monitoring the user's activities. Suspicious transactions can now be easily flagged to the user 120, and the user can audit through the list of flagged transactions and understand what is happening.

It is understood that the communication of the objects is not limited to the machine 110 or the user 120. A representative or a guardian of the user 120 may be contacted in instead (or in addition to the user). As an example, the user 120 may be an underage child. Therefore, the interface module 130 may send communication to the parent of the user 120 instead. The parent may then decide how to proceed on the user's behalf.

The resource-containing system 100 can also store historical access information for any given user, and display to the user the past access (whether successful or unsuccessful information). For example, the system 100 can store the historical access information (which are still considered contextual information) for a given user, which can be done using a database. For example, the historical access information may include all the specific times and locations from which the given user made requests to access the system.

Once the system 100 detects that the given user is making the access request, the system can retrieve the stored historical access information for that given user and display the historical access information back to the user by way of objects. In other words, the system cam display each instance of historical access with its associated object to the user. In this manner, the user can intuitively identify and monitor his historical activities.

In terms of object association, the present disclosure also involves a user feedback mechanism. In addition to (or instead of) the objects available from the database storing these objects, the resource-containing system 100 may prompt the user 120 to upload one or more user-defined objects to associate with a particular piece of contextual information. As an example, the user 120 may be prompted by a message stating "Mr. XYZ, we have detected your current location being San Francisco, Calif. Please click on the following link to upload an image that you would like to associate with your current location." In response to this prompt, the user 120 may upload a picture (e.g., a picture of his house) to the resource-containing system 100. The object-association module 150 will then associate this user-defined image with the location of San Francisco. Thereafter, when the user 120 accesses the resource-containing system 100, the resource-containing system will display the picture of the user's house if it detects that the user's location is in San Francisco.

The user feedback mechanism discussed above may also be used to allow the user 120 to tag or otherwise designate other contextual information in a way that makes sense to the user. For example, the user 120 may tag a particular piece of contextual information with "Ted's house" or "Coupa café." Some of these tags may be meaningful only to a given user and are only presented to the given user as the user audits the list of flagged transactions. Other tags may be meaningful to other users as well, and may therefore be integrated into the database after being validated. The resource-containing system 100 may also let other users choose these user-defined objects as their own objects. Furthermore, the feedback mechanism may allow the user 120 to add reminders, such as "Could this be Jim's phone? Check with him."

The feedback mechanism also allows the user 120 to identify incorrectly associated objects. For example, the user 120 may be physically located in Indiana, but the user's Internet service provider may be located in Chicago and may run a communication cable from Chicago to Indiana. In this case, the reverse IP address lookup operation discussed above may indicate that the user's location is in Chicago rather than Indiana. Consequently, an object depicting Chicago may be incorrectly associated with the retrieved false geographical information. However, when this object depicting Chicago is communicated to the user 120, the feedback mechanism allows the user to inform the resource-containing system 100 that he is actually located in Indiana, not Chicago. In response, the resource-containing system 100 may correctly associate an image of Indiana with the user's location. The resource-containing system 100 may also be intelligent enough to map the user's neighboring addresses to Indiana subsequently as well.

Also in an embodiment, the object communicated to the user 120 may have different degrees of granularity. For example, if the user 120 is located in Texas, then the object associated with the user's geographical information may contain information regarding the specific cities in Texas, for example Houston or Dallas. Whereas if the user 120 is located outside of Texas, then the object associated with the user's geographical information may merely include an image of the state of Texas, rather than the specific cities.

Some commercially available systems allow users to choose a certain image or icon to be displayed every time when the user logs on to the system for security reasons. The present disclosure differs from these commercially availably systems in several aspects. First, these commercially available systems only retrieve the user's login information, which is at best a subset of the contextual information discussed above. The contextual information includes other types of information such as the user's location, the type of device used to make the resource access request, the service provider used to make the request, the software and hardware configurations of the machine used to make the request, etc.

Second, these commercially available systems essentially link a "static" image or icon to the user's login information. Thus, these static images or icons do not change unless the user decides to change them later. In contrast, the objects discussed above are not static but are rather dynamic. Stated differently, the objects are dynamically associated with the user's contextual information, based on what the retrieved contextual information entails. For example, if the retrieved contextual information involves the user's location, then one object may be associated. On the other hand, if the retrieved contextual information involves the user's device, then a different object may be associated. The object to be associated is not set in stone or predetermined until after the contextual information is retrieved. Hence, the object may change every time the user logs on to the system, even if the user remains the same.

Third, the images or icons supplied by the commercially available systems typically do not convey any underlying information that is carried by the retrieved contextual information. As an example, a banking web site may display pictures of random objects such as a mountain, an animal, a chessboard, or the sky to a user and ask the user to pick one of these images as his login image. The user chooses one of these images, say the mountain as his linked image. Thereafter, each time the user logs on to the banking web site, the image of the mountain is displayed. But the problem is that the image of the mountain tells nothing useful about the user's contextual information. For example, this mountain image does not disclose whether the access request originates from, or the type of device that is used to make the access request. Hence, these predetermined static images are not very useful to the user due at least in part to their lack of ability to convey meaningful information. In contrast, the objects in the present disclosure convey meaningful information to the user. Each object is capable to signify, embody, symbolize, stand for, or characterize the contextual information to the user. For example, most people can instantly recognize that a picture of the Golden Gate Bridge symbolizes San Francisco, and as such, the geographical information regarding the access request can be conveyed to the user intuitively.

The above differences are merely examples and are not meant to be limiting. The present disclosure is different from and offers advantages over prior art systems in other ways, but they are not discussed herein for the sake of simplicity.

Figure 4:
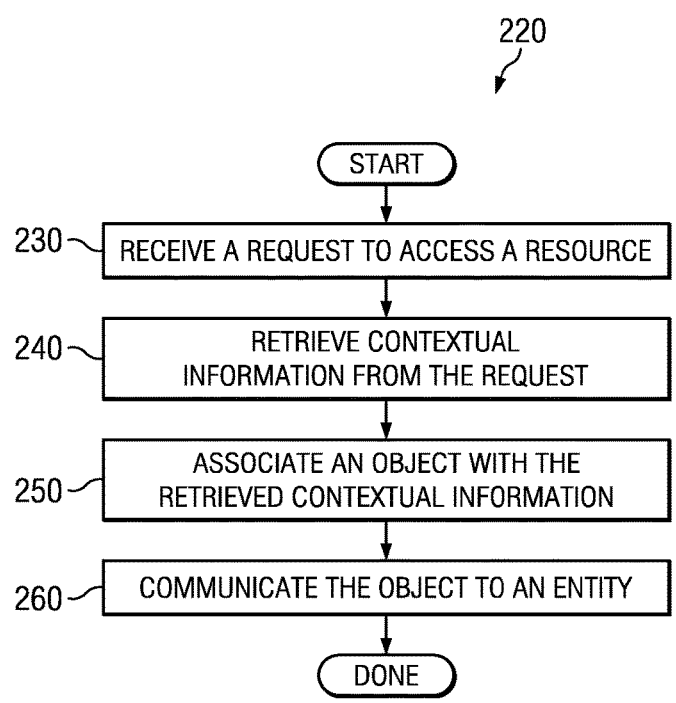
FIG. 4 illustrates a flowchart of various process flows according to various aspects of the present disclosure.

FIG. 4 is a flowchart illustrating a method 220 of visualizing access information according to the discussions above. The method 220 includes a block 230 in which a request to access a resource is received. For example, a resource-containing system may receive a request to access its resources from a machine. The method 220 continues with block 240 in which contextual information is retrieved from the request. Contextual information may include, but is not limited to, geographical information, service provider information, or hardware and software configuration information. The contextual information may be retrieved using methods such as reverse IP address lookup or MAC address lookup, or through browser communication. The method 220 continues with block 250 in which an object is dynamically associated with the retrieved contextual information. The object may contain visual and/or audio information that can represent, signify, embody, symbolize, stand for, characterize, or otherwise convey the retrieved contextual information in a meaningful way. Thus, the object enables a user to intuitively and easily understand the relevant contextual information so as to facilitate the monitoring of his activities. The object may be a publicly-known object stored in a database or may be a user-defined object that can be uploaded by a user. The association of the object is done in a dynamic fashion, meaning that the object to be associated may change depending on the retrieved contextual information. Even if the user who is making the request remains the same, the object may change to reflect the changes in the retrieved contextual information. The method 220 continues with block 260 in which the object is communicated to an entity. The object may be displayed to the user or may be emailed or texted to the user. Authorization from the user may be required before resource access is granted. It is understood that the method 220 may include additional blocks that may be executed before, during, or after any of the blocks 230-260.

Figure 5:
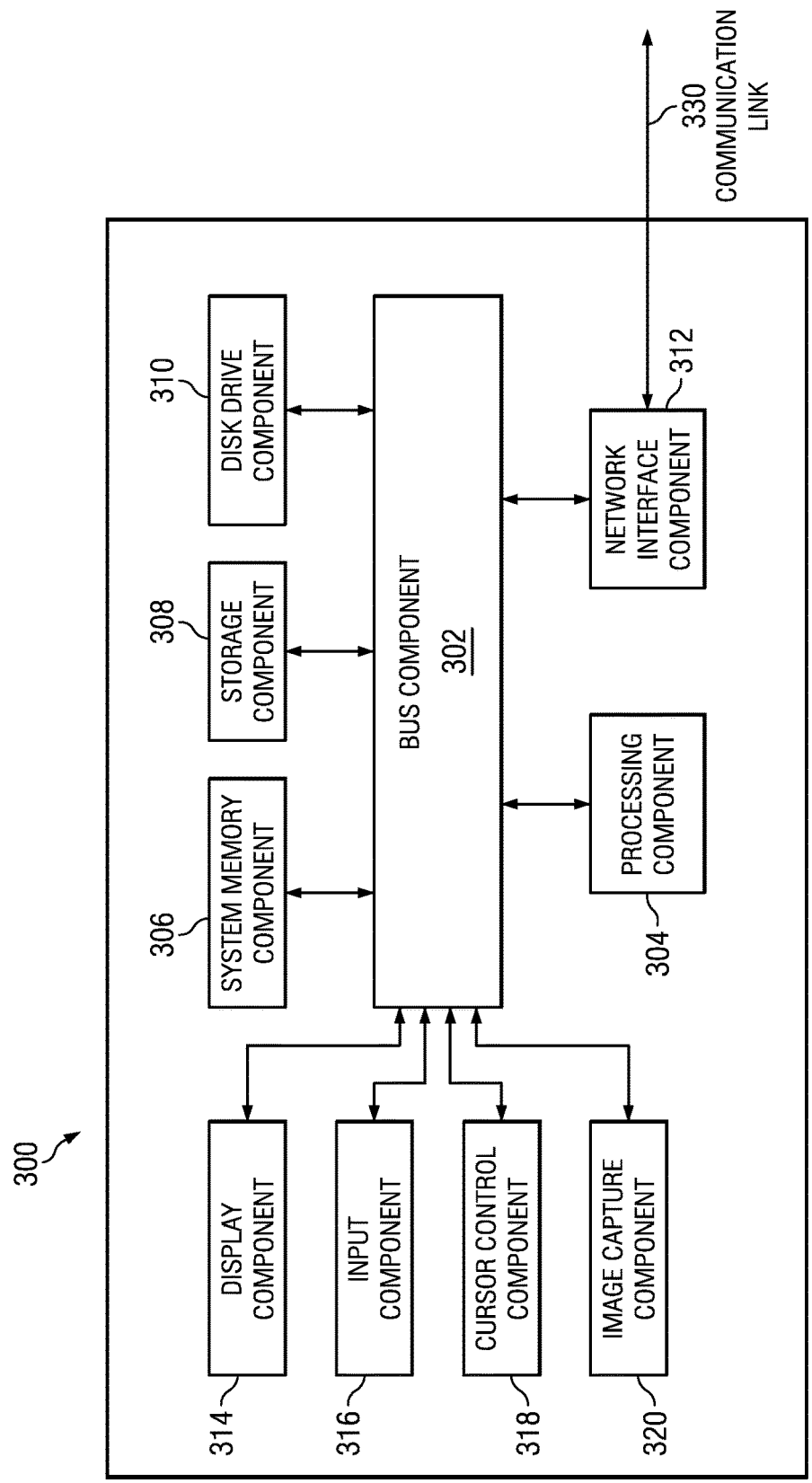
FIG. 5 shows a block diagram of a computer system for implementing various methods and devices described according to various aspects of the present disclosure.

FIG. 5 is a block diagram of a computer system 300 suitable for implementing various methods and devices described herein, for example, the various method blocks of the method 200. In various implementations, user devices (such as managed by the prospective buyer) may comprise a network communications device (e.g., mobile cellular phone, laptop, personal computer, etc.) capable of communicating with a network, and a service provider device (such as managed by a third party payment platform) may comprise a network computing device (e.g., a network server). In other implementations, it should be appreciated that the service provider device may comprise a network communications device (e.g., mobile cellular phone, laptop, personal computer, etc.) capable of communicating with the network, without departing from the scope of the present disclosure. Accordingly, it should be appreciated that each of the devices may be implemented as the computer system 300 for communication with the network in a manner as follows.

In accordance with various embodiments of the present disclosure, the computer system 300, such as a mobile communications device and/or a network server, includes a bus component 302 or other communication mechanisms for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., cathode ray tube (CRT) or liquid crystal display (LCD)), input component 316 (e.g., keyboard), cursor control component 318 (e.g., mouse or trackball), and image capture component 320 (e.g., analog or digital camera). In one implementation, disk drive component 310 may comprise a database having one or more disk drive components.

In accordance with embodiments of the present disclosure, computer system 300 performs specific operations by processor 304 executing one or more sequences of one or more instructions contained in system memory component 306. Such instructions may be read into system memory component 306 from another computer readable medium, such as static storage component 308 or disk drive component 310. In other embodiments, hard-wired circuitry may be used in place of (or in combination with) software instructions to implement the present disclosure.

Logic may be encoded in a computer readable medium, which may refer to any medium that participates in providing instructions to processor 304 for execution. Such a medium may take many forms, including but not limited to, non-volatile media and volatile media. In one embodiment, the computer readable medium is non-transitory. In various implementations, non-volatile media includes optical or magnetic disks, such as disk drive component 310, and volatile media includes dynamic memory, such as system memory component 306. In one aspect, data and information related to execution instructions may be transmitted to computer system 300 via a transmission media, such as in the form of acoustic or light waves, including those generated during radio wave and infrared data communications. In various implementations, transmission media may include coaxial cables, copper wire, and fiber optics, including wires that comprise bus 302.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 330 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 330 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:

receiving, from a machine operated by an entity, a request to access a resource associated with an account of a user, wherein the request contains machine data, and wherein the user is an owner of the account;

retrieving one or more computer technology terms from the machine data, wherein the one or more computer technology terms comprise an Internet Protocol (IP) address;

determining a location of the machine by performing a reverse address lookup on the one or more computer technology terms, wherein determining the location further comprises determining whether the machine is located within a predefined geographical area or outside of the predefined geographical area;

associating a first object with the location of the machine in response to the location being determined to be located within the predefined geographical area;

associating a second object with the location of the machine in response to the location being determined to be located outside of the predefined geographical area, wherein the first object contains information corresponding to a sub-location within the predefined geographical area and the second object contains information corresponding to the predefined geographical area as a whole, wherein the first object and the second object convey different information associated with the one or more computer technology terms, but not the computer technology terms themselves, wherein the information conveyed by the first object contains more details regarding the predefined geographical area than the information conveyed by the second object, wherein the first object and the second object are publicly-known objects;

communicating and displaying, via a text message, the first object to the user in response to the determination that the request is from the machine located within the predefined geographical area; and communicating and displaying, via the text message, the second object to the user in response to the determination that the response is from the machine located outside of the predefined geographical area, wherein the first object comprises a first picture corresponding to a geographical area including the sub-location that is smaller than and within the predefined geographical area, and wherein the second object comprises a second picture corresponding to the predefined geographical area as a whole.

2. The method of claim 1, wherein the one or more computer technology terms further comprise a Media Access Control (MAC) address, and wherein the method further comprises: determining a hardware configuration of the machine by performing a Media Access Control (MAC) address lookup.

3. The method of claim 2, wherein the method further comprises:
communicating a third object to the user, the third object containing visual information or audio information representing the hardware configuration of the machine.

4. The method of claim 1, wherein the method further comprises:
determining a service provider information of the machine; and
communicating a third object to the user, the third object containing visual information or audio information representing the service provider information of the machine.

5. The method of claim 1, wherein the method further comprises:
determining a software configuration of the machine; and
communicating a third object to the user, the third object containing visual information or audio information representing the software configuration of the machine.

6. The method of claim 1, wherein the method further comprises:
determining a historical access information of the machine; and
communicating a third object to the user, the third object containing visual information or audio information representing the historical access information of the machine.

7. The method of claim 1, wherein the first object or the second object further comprises an audio component.

8. A system, comprising:
a non-transitory memory storing executable instructions; and
one or more hardware processors coupled to the non-transitory memory and configured to read instructions from the non-transitory memory to cause the system to perform operations comprising:
receiving, from a machine operated by an entity, a request to access a resource associated with an account of a user, wherein the request contains machine data, and wherein the user is an owner of the account;
retrieving one or more computer technology terms from the machine data, wherein the one or more computer technology terms comprise an Internet Protocol (IP) address;
determining a location of the machine by performing a reverse address lookup on the one or more computer technology terms, wherein determining the location further comprises determining whether the machine is located within a predefined geographical area or outside of the predefined geographical area;
associating a first object with the location of the machine in response to the location being determined to be located within the predefined geographical area;
associating a second object with the location of the machine in response to the location being determined to be located outside of the predefined geographical area, wherein the first object contains information corresponding to a sub-location within the predefined geographical area and the second object contains information corresponding to the predefined geographical area as a whole, wherein the first object and the second object convey different information associated with the one or more computer technology terms, but not the computer technology terms themselves, wherein the information conveyed by the first object contains more details regarding the predefined geographical area than the information conveyed by the second object, wherein the first object and the second object are publicly-known objects;
communicating and displaying, via a text message, the first object to the user in response to the determination that the request is from the machine located within the predefined geographical area; and
communicating and displaying, via the text message, the second object to the user in response to the determination that the response is from the machine located outside of the predefined geographical area, wherein the first object comprises a first picture corresponding to a geographical area including the sub-location that is smaller than and within the predefined geographical area, and wherein the second object comprises a second picture corresponding to the predefined geographical area as a whole.

9. The system of claim 8, wherein the one or more computer technology terms further comprise a Media Access Control (MAC) address, and wherein the operations further comprise: determining a hardware configuration of the machine by performing a Media Access Control (MAC) address lookup.

10. The system of claim 9, wherein the operations further comprise: communicating a third object to the user, the third object containing visual information or audio information representing the hardware configuration of the machine.

11. The system of claim 8, wherein the operations further comprise:
determining a service provider information of the machine; and
communicating a third object to the user, the third object containing visual information or audio information representing the service provider information of the machine.

12. The system of claim 8, wherein the operations further comprise:
determining a software configuration of the machine; and
communicating a third object to the user, the third object containing visual information or audio information representing the software configuration of the machine.

13. The system of claim 8, wherein the operations further comprise:
determining a historical access information of the machine; and
communicating a third object to the user, the third object containing visual information or audio information representing the historical access information of the machine.

14. The system of claim 8, wherein the first object or the second object further comprises an audio component.

15. A non-transitory machine-readable medium having stored thereon machine-readable instructions executable to cause a device to perform operations comprising:

receiving, from a machine operated by an entity, a request to access a resource associated with an account of a user, wherein the request contains machine data, and wherein the user is an owner of the account;

retrieving one or more computer technology terms from the machine data, wherein the one or more computer technology terms comprise an Internet Protocol (P) address;

determining a location of the machine by performing a reverse address lookup on the one or more computer technology terms, wherein determining the location further comprises determining whether the machine is located within a predefined geographical area or outside of the predefined geographical area;

associating a first object with the location of the machine in response to the location being determined to be located within the predefined geographical area;

associating a second object with the location of the machine in response to the location being determined to be located outside of the predefined geographical area, wherein the first object contains information corresponding to a sub-location within the predefined geographical area and the second object contains information corresponding to the predefined geographical area as a whole, wherein the first object and the second object convey different information associated with the one or more computer technology terms, but not the computer technology terms themselves, wherein the information conveyed by the first object contains more details regarding the predefined geographical area than the information conveyed by the second object, wherein the first object and the second object are publicly-known objects;

communicating and displaying, via a text message, the first object to the user in response to the determination that the request is from the machine located within the predefined geographical area; and communicating and displaying, via the text message, the second object to the user in response to the determination that the response is from the machine located outside of the predefined geographical area, wherein the first object comprises a first picture corresponding to a geographical area including the sub-location that is smaller than and within the predefined geographical area, and wherein the second object comprises a second picture corresponding to the predefined geographical area as a whole.

16. The non-transitory machine-readable medium of claim 15, wherein the one or more computer technology terms further comprise a Media Access Control (MAC) address, and wherein the operations further comprise:

determining a hardware configuration of the machine by performing a Media Access Control (MAC) address lookup; and communicating a third object to the user, the third object containing visual information or audio information representing the hardware configuration of the machine.

17. The non-transitory machine-readable medium of claim 15, wherein the operations further comprises:

determining a service provider information of the machine; and communicating a third object to the user, the third object containing visual information or audio information representing the service provider information of the machine.

18. The non-transitory machine-readable medium of claim 15, wherein the operations further comprise:

determining a software configuration of the machine; and communicating a third object to the user, the third object containing visual information or audio information representing the software configuration of the machine.

19. The non-transitory machine-readable medium of claim 15, wherein the operations further comprise:

determining a historical access information of the machine; and communicating a third object to the user, the third object containing visual information or audio information representing the historical access information of the machine.

20. The non-transitory machine-readable medium of claim 15, wherein the first object or the second object further comprises an audio component.

* * * * *